J. SPLANN.
SPRING WHEEL.
APPLICATION FILED NOV. 1, 1916.
1,232,991.
Patented July 10, 1917.
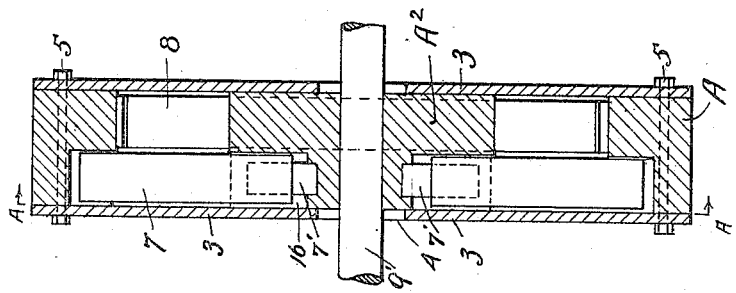
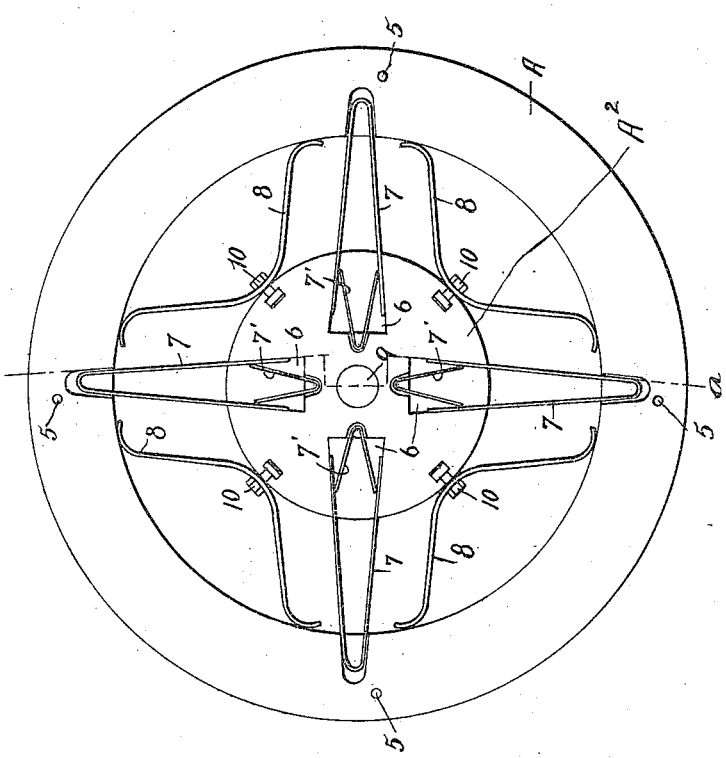
WITNESSES:
a. C. Maher.
J. A. Rosenberg.
INVENTOR.
John Splann
BY F. N. Gilbert
ATTORNEYS.

UNITED STATES PATENT OFFICE.

JOHN SPLANN, OF BINGHAMTON, NEW YORK.

SPRING-WHEEL.

1,232,991.  Specification of Letters Patent.  Patented July 10, 1917.

Application filed November 1, 1916.  Serial No. 128,864.

*To all whom it may concern:*

Be it known that I, JOHN SPLANN, a citizen of the United States, residing at Binghamton, in the county of Broome and State of New York, have invented certain new and useful Improvements in Spring-Wheels, of which the following is a specification.

My invention relates to an improvement in spring wheels, in which a vehicle wheel is constructed having an exterior rim surrounding an interior disk which is mounted and which disk and rim are separated from each other by supporting springs and incased between side plates mounted on the outer rim; and it has for its object to provide a spring wheel for vehicles adapted to sustain its resiliency under a heavy load and avoid the use of pneumatic tires and is particularly adapted for automobiles. With this object in view my invention consists of certain novel features of construction and arrangements of the parts as will be hereinafter more fully pointed out in the claim, reference being had to the accompanying drawings, in which Figure 1 represents a side view of my device, with one of the side plates removed. Fig. 2 is a transverse view taken on the broken line $a$—$a$ of Fig. 1, showing the springs in elevation. The same reference characters denote like parts in each of the several figures of the drawings. In carrying out my invention, I provide an outer rim A, and the interior disk $A^2$ through which is the axle opening 9. Mounted on each side of the outer rim A and the inner disk $A^2$, I have the plates 3. 3 having the opening 4 which plates 3. 3 are fastened to the outer rim A by means of the bolts 5 or in any other convenient manner. Entering into the center or inner disk $A^2$ I have the recesses 6. 6. 6. etc. Mounted on the interior of the outer rim A, I have the wedge springs 7 which project into and have sliding connection with the recesses 6. 6. 6. etc. Between the outer surface of the center disk $A^2$ and the inner surface of the rim A, I have mounted the springs 8. 8 which are rigidly mounted on the outer face of the inner disk $A^2$ in any convenient manner and have slidable contact with the inner face of the rim A. Through the axle opening 9, I have mounted the axle 9'. Mounted in the disk $A^2$ at the base of the recesses 6. 6. 6., I have the wedge springs 7'. 7'. 7'., having sliding contact with the springs 7. 7. 7. As the axle 9 turns the center disk $A^2$, its contact with the wedge springs 7 which are supported by the interior wedge spring 7'. 7'., enables it to turn the outer rim A and when the weight of the vehicle bears down upon the center disk $A^2$ at any time, the disk, as the wheel revolves, is adapted to press down upon the springs 8. 8. 8. etc., and to be supported and have resilient movement between the plates 3. 3.

Having thus described my invention what I claim as new and for which I desire Letters Patent, is as follows.

In a vehicle wheel, an interior disk adapted to be mounted on an axle, said disk being provided with wedge shaped recesses let into one face of said disk and extending inwardly from its edge, an outer wheel rim, springs in line with the rim mounted on the edge of the disk and having contact with the interior of the rim, wedge shaped springs mounted on the interior of the rim and extending into and having sliding contact with the recesses in the disk, and wedge shaped springs mounted in the base of the recesses in the disk, and having sliding contact with the springs on the interior of the rim.

In testimony whereof I have affixed my signature in the presence of two witnesses.

JOHN SPLANN.

Witnesses:
J. A. ROSENBERG,
E. M. HOWEY.

Copies of this patent may be obtained for five cents each, by addressing the "Commissioner of Patents, Washington, D. C."